(12) United States Patent
Kimura et al.

(10) Patent No.: US 9,175,374 B2
(45) Date of Patent: Nov. 3, 2015

(54) HIGH STRENGTH HOT-DIP GALVANIZED STEEL SHEET HAVING EXCELLENT DEEP DRAWABILITY

(75) Inventors: Hideyuki Kimura, Fukuyama (JP); Kaneharu Okuda, Kawasaki (JP); Yasunobu Nagataki, Chiyoda-ku (JP); Kenji Kawamura, Chiyoda-ku (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/239,683

(22) PCT Filed: Aug. 23, 2012

(86) PCT No.: PCT/JP2012/005280
§ 371 (c)(1),
(2), (4) Date: Jun. 9, 2014

(87) PCT Pub. No.: WO2013/031151
PCT Pub. Date: Mar. 7, 2013

(65) Prior Publication Data
US 2014/0363695 A1    Dec. 11, 2014

(30) Foreign Application Priority Data

Aug. 26, 2011  (JP) ................................ 2011-184227
Aug. 16, 2012  (JP) ................................ 2012-180435

(51) Int. Cl.
| | |
|---|---|
| B32B 15/04 | (2006.01) |
| B32B 15/18 | (2006.01) |
| C23C 2/02 | (2006.01) |
| C23C 2/06 | (2006.01) |
| C21D 8/02 | (2006.01) |
| C23C 2/28 | (2006.01) |
| C21D 9/48 | (2006.01) |
| C22C 38/00 | (2006.01) |
| C22C 38/14 | (2006.01) |
| C22C 38/60 | (2006.01) |
| B32B 15/01 | (2006.01) |
| C22C 38/02 | (2006.01) |
| C22C 38/04 | (2006.01) |
| C22C 38/06 | (2006.01) |
| C22C 38/12 | (2006.01) |
| C23C 2/40 | (2006.01) |

(52) U.S. Cl.
CPC ............... *C23C 2/02* (2013.01); *B32B 15/013* (2013.01); *C21D 8/0236* (2013.01); *C21D 8/0263* (2013.01); *C21D 9/48* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *C23C 2/06* (2013.01); *C23C 2/28* (2013.01); *C23C 2/40* (2013.01); *Y10T 428/12799* (2015.01); *Y10T 428/12972* (2015.01)

(58) Field of Classification Search
CPC .............. C23C 2/40; C23C 2/02; C23C 2/06; C23C 2/28; B32B 15/01; B32B 15/013; B32B 15/04; B32B 15/18; Y10T 428/12799; Y10T 428/12972; C22C 38/60; C22C 38/001; C22C 38/04; C22C 38/02; C22C 38/002; C22C 38/06; C22C 38/12; C22C 38/00; C22C 38/14
See application file for complete search history.

(56) References Cited

U.S. PATENT DOCUMENTS

2013/0292010 A1\* 11/2013 Kimura et al. ................ 148/533

FOREIGN PATENT DOCUMENTS

| JP | 55-10650 | | 3/1980 |
|---|---|---|---|
| JP | 56-139654 | A | 10/1981 |
| JP | 2002-226941 | A | 8/2002 |
| JP | 2003-064444 | A | 3/2003 |
| JP | 2003-193189 | \* | 7/2003 |
| JP | 2005-120467 | A | 5/2005 |
| JP | 2005-256020 | A | 9/2005 |
| JP | 2005-264212 | A | 9/2005 |
| JP | 2008-174825 | A | 7/2008 |
| JP | 2010-18852 | A | 1/2010 |
| JP | 2011-219855 | \* | 11/2011 |
| JP | 2012-92427 | A | 5/2012 |
| WO | WO 2012/043420 | \* | 4/2012 |

OTHER PUBLICATIONS

Machine Translation, Hanazawa et al., JP 2003-193189, Jul. 2003.\*
Machine Translation, JFE Steel, JP 2011-219855, Nov. 2011.\*
International Search Report dated Nov. 27, 2012, application No. PCT/JP2012/005280.

\* cited by examiner

*Primary Examiner* — Michael E La Villa
(74) *Attorney, Agent, or Firm* — RatnerPrestia

(57) ABSTRACT

A high strength hot-dip galvanized steel sheet has TS of 440 MPa or more and an average r value of 1.30 or more, where the absolute value of the planar anisotropy of the r value ($\Delta r$) is 0.20 or less. A chemical composition contains C: 0.010% or more and 0.04% or less, Si: more than 1.0% and 1.5% or less, Mn: 1.0% or more and 3.0% or less, P: 0.005% or more and 0.1% or less, S: 0.01% or less, sol. Al: 0.005% or more and 0.5% or less, N: 0.01% or less, Nb: 0.010% or more and less than 0.05%, Ti: 0.015% or more and 0.120% or less, and the remainder composed of Fe and incidental impurities, wherein (Nb/93)/(C/12) 0.20 and $0.005 < C^* \le 0.020$ are satisfied.

4 Claims, No Drawings

HIGH STRENGTH HOT-DIP GALVANIZED STEEL SHEET HAVING EXCELLENT DEEP DRAWABILITY

CROSS REFERENCE TO RELATED APPLICATIONS

This is the U.S. National Phase application of PCT International Application No. PCT/JP2012/005280, filed Aug. 23, 2012, and claims priority to Japanese Patent Application No. 2011-184227, filed Aug. 26, 2011 and Japanese Patent Application No. 2012-180435, filed Aug. 16, 2012, the disclosures of each of these applications being incorporated herein by reference in their entireties for all purposes.

FIELD OF THE INVENTION

The present invention relates to a high strength hot-dip galvanized steel sheet, which has excellent deep drawability, which is a high strength steel sheet being useful for application to automobile steel sheets and the like and having a tensile strength (TS) of 440 MPa or more, and which has a high r value (average r value≥1.30), where the absolute value of the planar anisotropy of the r value (Δr) is as small as 0.20 or less, and a method for manufacturing the same.

BACKGROUND OF THE INVENTION

In recent years, an improvement in automobile fuel efficiency (car body weight reduction) to regulate the amount of $CO_2$ emission has been required from the viewpoint of global environmental conservation. In addition to this, in order to ensure the safety of occupants at the time of crash, an improvement in safety on the crash properties of automobile bodies has also been required. It is said that weight reduction due to a decrease in sheet thickness by the high strengthening of a steel sheets within the range of not impairing the stiffness is effective in satisfying an automobile body weight reduction and an improvement in safety at the same time. Recently, high strength steel sheet has been actively used for automobile parts. The weight reduction effect increases as the steel sheet used has higher strength. Therefore, in the automobile industry, there is a tendency to use steel sheet having TS of 440 MPa or more as, for example, an inner panel and an outer panel.

On the other hand, most of automobile parts are formed by press forming. Therefore, an automobile steel sheet is required to have excellent press formability. However, a high strength steel sheet has significantly poor formability, in particular deep drawability, as compared with a mild steel sheet. Consequently, demands for a steel sheet satisfying TS 440 MPa, more preferably TS 500 MPa, and further preferably TS 590 MPa and having still better deep drawability in combination have been increased as issues in pursuing automobile weight reduction, and a high strength steel sheet having a high r value, where an average r value≥1.30 on a Lankford value (hereafter referred to as an r value), which is an evaluation indicator of the deep drawability, has been required.

Furthermore, when the average r values are the same, a reduction in the planar anisotropy has also been required for the smaller planar anisotropy contributes to an improvement in the formability.

As how to enhance the strength while it maintains high r value, for example, Patent Literature 1 discloses a method in which, with respect to an ultra low carbon steel sheet, solid-solution hardening elements, e.g., Si, Mn, and P, are added to a base steel allowed to become IF (Interstitial atom free) steel by addition of Ti or Nb.

However, according to such a technology in which the ultra low carbon steel is used as a raw material and a solution hardening element is added, when production of a high strength steel sheet having TS of 440 MPa or more, 500 MPa or more, or 590 MPa or more is intended, the amount of addition of an alloy element increases. For example, if the amount of addition of Si increases, Si is concentrated in the surface during continuous annealing and reacts with very small amount of water vapor in the atmosphere, Si based oxides are formed on the steel sheet surface, the wettability of the coating is made poor and the quality of coating is degraded significantly. Meanwhile, there are problems in that if the amount of addition of P increases, P segregates at grain boundaries to degrade the resistance to cold-work embrittlement, if the amount of addition of Mn increases, the r value decreases and, therefore, if enhancement of strength is intended, the r value decreases.

As how to enhance the strength of a steel sheet, besides the above-described solid-solution hardening method, a transformation strengthening method is mentioned. In general, a dual-phase steel sheet made from soft ferrite and hard martensite has good ductility and excellent strength-ductility balance and further has a feature of low yield strength. Consequently, the press formability is relatively good. However, the r value is low, and the deep drawability is poor. It is said that this is because martensite, which does not contribute to the r value from the viewpoint of crystal orientation, is present and, in addition, solid solution C indispensable to formation of martensite hinders formation of a {111} recrystallization texture effective for increasing the r value.

As for a technology to improve the r value of such a dual-phase steel sheet, for example, Patent Literature 2 discloses a method in which box annealing is performed at a temperature from a recrystallization temperature to an $Ac_3$ transformation point after cold rolling and, subsequently, in order to obtain dual phase, quenching and tempering is performed after heating in temperature of 700° C. to 800° C. Meanwhile, Patent Literature 3 discloses a high strength steel sheet containing a predetermined amount of C, including 3% or more of at least one of bainite, martensite, and austenite in total in the microstructure, and having an average r value of 1.3 or more.

However, both the technologies described in Patent Literatures 2 and 3 are in need of each of the annealing, which enhances the r value by developing a texture through formation of clusters and precipitates of Al and N, and the heat treatment to form the microstructure. In this regard, at the annealing process, box annealing is required and the holding time is 1 hour or more. Therefore, the box annealing is necessary, but the treatment time is long and the number of steps increases as compared with continuous annealing. Consequently, the efficiency and the productivity are very poor, so that the economy is poor from the viewpoint of the production cost. In addition, there are many problems, e.g., frequent occurrences of adhesion between steel sheets, occurrences of temper color, and reduction in the life of a furnace body inner cover, in the production process.

Meanwhile, Patent Literature 4 discloses a technology to improve the r value of a dual-phase steel sheet by optimizing the V content related to the C content. This produces a dual-phase steel sheet by minimizing the amount of solid solution C through precipitation of C in a steel as a V based carbide before recrystallization annealing to increase the r value, performing heating in an α-γ two-phase region to dissolve the V based carbide and concentrate C into γ, and generating martensite in a cooling step thereafter.

However, in the method in which the V based carbide is dissolved during the two-phase annealing, there is apprehension that the mechanical properties fluctuates because of variations in the dissolution rate of V carbide. Therefore, it is necessary that the annealing temperature and the annealing time be controlled with high precision, and there is a problem in the stability in production with an actual facilities.

Also, Patent Literature 5 discloses a technology to ensure compatibility between a high r value and conversion to a dual-phase by performing control in such a way that the C content is within the range of 0.010% to 0.050% and the Nb content and the C content satisfy $0.2 \leq (Nb/93)/(C/12) \leq 0.7$. In this regard, according to the technology disclosed, solid solution C necessary for forming martensite after annealing is allowed to remain at the stage of hot rolled sheet and, in addition, the r value is increased on the basis of an effect of a grain refinement of hot-rolled microstructures due to addition of Nb and an effect of reducing solid solution C due to precipitation of NbC.

However, it is the element which the Nb has high cost and delays recrystallization of the austenite. Therefore, there is a problem in that a load in hot rolling is high. In addition, NbC precipitated in the hot rolled sheet enhances the deformation resistance during cold rolling. Therefore, a risk of trouble of the production increases and, in addition, there are problems, e.g., reduction in productivity and limitation on the range of producible products. In this regard, according to the research of the present inventors, in the case where the amount of Nb and the amount of C are somewhat large in this technology, the average r value is good, although the planar anisotropy of the r value tends to increase. Consequently, it is an issue to reduce the planar anisotropy of the r value in a high C content region.

Also, Patent Literature 6 discloses a technology to obtain a high strength steel sheet, wherein the average r value $\geq 1.2$ is satisfied and the planar anisotropy thereof is reduced by controlling the Nb content and the C content in a steel in such a way that (Nb/93)/(C/12) becomes 0.15 to 0.45, where the C content is within the range of 0.035% to 0.05%, controlling the slab heating temperature to become 1,000° C. to 1,200° C. and satisfy a relational expression in accordance with the amount of C and the amount of Nb, performing cold rolling, and performing slow heating in a high-temperature region after recrystallization, so as to develop a {111} recrystallization texture effectively. In addition, a technology to perform combined addition in such a way that the Nb content, the Ti content, and the V content satisfy {(Nb/93)+(Ti*/48)+(V/51)}/(C/12)=0.15 to 0.45 has been disclosed, where Ti*=Ti—1.5S-3.4 N and Ti*=0 when Ti*≤0.

However, in the technology described in Patent Literature 6, the average r value in the examples is 1.32 at the maximum and the r values are not always good although the C content is a somewhat high 0.035% to 0.05% and, therefore, the average r value ≥1.2 is satisfied. Therefore, it is predicted that application to a part required to have a higher r value is difficult. Meanwhile, the cost is high because 0.05% or more of very expensive Nb is contained to achieve the average r value ≥1.2, and there is a problem in that a load during hot rolling is high because Nb delays recrystallization of austenite remarkably. Also, NbC precipitated in a hot rolled sheet enhances the deformation resistance during cold rolling and, therefore, reduction in productivity, limitation on the range of producible products, and the like become problems.

PATENT LITERATURE

PTL 1: Japanese Unexamined Patent Application Publication No. 56-139654
PTL 2: Japanese Examined Patent Application Publication No. 55-10650
PTL 3: Japanese Unexamined Patent Application Publication No. 2003-64444
PTL 4: Japanese Unexamined Patent Application Publication No. 2002-226941
PTL 5: Japanese Unexamined Patent Application Publication No. 2005-120467
PTL 6: Japanese Unexamined Patent Application Publication No. 2008-174825

SUMMARY OF THE INVENTION

In enhancement of the strength of a mild steel sheet having excellent deep drawability, the previously studied method for enhancing the strength through solid solution hardening requires addition of large amounts of alloy elements. This has problems in cost and quality of the coating, and has a problem in an improvement in the r value itself. Meanwhile, the method utilizing transformation strengthening requires two-time annealing method and, therefore, has a problem in a production process. In a method utilizing VC, the mechanical property fluctuates for change of the dissolution rate of VC. Therefore, it is necessary that the annealing temperature and the annealing time be controlled with high precision, and there is a problem in the stability in production with an actual facilities. In addition, the technology to increase the r value on the basis of an effect of a grain refinement of hot-rolled microstructures due to addition of Nb and an effect of reducing the amount of solid solution C due to precipitation of NbC has been disclosed. However, Nb is high cost, and further, Nb delays the recrystallization of austenite and raises the load of hot rolling remarkably. In addition, NbC precipitated in the hot rolled sheet enhances the deformation resistance during cold rolling.

The present invention provides a high strength galvanized steel sheet, which has excellent deep drawability and which has TS of 440 MPa or more and an average r value of 1.30 or more, where the absolute value of the planar anisotropy of the r value (Δr) is 0.20 or less, and a method for manufacturing the same. Also, it provides a high strength galvanized steel sheet having excellent deep drawability, wherein an average r value of 1.30 or more and the planar anisotropy thereof is small in spite of a high strength of TS≥500 MPa, or furthermore, TS≥590 MPa, and a method for manufacturing the same.

As for the present invention, intensive researches were performed to solve the above-described problems, and a high strength galvanized steel sheet having an average r value of 1.30 or more and, therefore, excellent deep drawability, a small absolute value of the planar anisotropy of the r value (Δr) of 0.20 or less, and a steel sheet microstructure including ferrite and martensite was successfully obtained by regulating the Nb content in relation to the C content, where the C content is within the range of 0.010% to 0.04% and, furthermore, controlling the amount of solid solution C to be within the range satisfying the relational expression described later without adding alloy elements excessively and using special facilities.

Aspects of the present invention will be described below.

(1) A high strength hot-dip galvanized steel sheet having excellent deep drawability, characterized by having a chemical composition containing C: 0.010% or more and 0.04% or less, Si: more than 1.0% and 1.5% or less, Mn: 1.0% or more and 3.0% or less, P: 0.005% or more and 0.1% or less, S: 0.01% or less, sol. Al: 0.005% or more and 0.5% or less, N: 0.01% or less, Nb: 0.010% or more and less than 0.05%, Ti: 0.015% or more and 0.120% or less, and the remainder comprising Fe and incidental impurities, on a percent by mass basis, while contents (percent by mass) of Nb and C in a steel satisfy the relationship of (Nb/93)/(C/12)<0.20 and, furthermore, satisfy 0.005<C*≤0.020, wherein a steel sheet microstructure includes 80% or more of ferrite and 3% or more of martensite on an area ratio basis, the tensile strength is 440 MPa or more, the average r value is 1.30 or more, and the absolute value of the planar anisotropy of the r value (Δr) is 0.20 or less.

In this regard, C*=C-(12/93)Nb-(12/48){Ti-(48/14)N-(48/32)S} is defined and C, Nb, Ti, N, and S represent the contents (percent by mass) of their respective elements in the steel.

(2) The high strength hot-dip galvanized steel sheet having excellent deep drawability, according to the above-described item (1), characterized by further containing 0.5% or less of at least one of Mo, Cr, and V in total on a percent by mass basis in addition to the above-described chemical composition.

(3) The high strength hot-dip galvanized steel sheet having excellent deep drawability, according to the above-described item (1) or item (2), characterized by further containing at least one of Cu: 0.3% or less and Ni: 0.3% or less on a percent by mass basis in addition to the above-described chemical composition.

(4) The high strength hot-dip galvanized steel sheet having excellent deep drawability, according to any one of the above-described items (1) to (3), characterized by further containing at least one of Sn: 0.20% or less and Sb: 0.20% or less on a percent by mass basis in addition to the above-described chemical composition.

(5) The high strength hot-dip galvanized steel sheet having excellent deep drawability, according to any one of the above-described items (1) to (4), characterized by further containing Ta: 0.01% to 0.10% on a percent by mass basis in addition to the above-described chemical composition, and the following C* in place of C* described above satisfies 0.005<C*≤0.020.

In this regard, C*=C-(12/93)Nb-(12/181)Ta-(12/48){Ti-(48/14)N-(48/32)S} is defined and C, Nb, Ta, Ti, N, and S represent the contents (percent by mass) of their respective elements in the steel.

(6) A method for manufacturing a high strength hot-dip galvanized steel sheet having excellent deep drawability, characterized by including the steps of hot rolling and cold rolling the steel having the chemical composition according to any one of the above-described items (1) to (5), performing heating in a temperature range of 700° C. to 800° C. at an average heating rate of less than 3° C./s, performing annealing at an annealing temperature of 800° C. to 950° C., performing cooling from the above-described annealing temperature at an average cooling rate of 3° C./s to 15° C./s, performing dipping into a galvanizing bath to perform galvanization, and performing cooling at an average cooling rate of 5° C./s to 100° C./s after the above-described galvanization or performing an alloying treatment of zinc coating after the above-described galvanization, and performing cooling at an average cooling rate of 5° C./s to 100° C./s after the above-described alloying treatment.

(7) The method for manufacturing a high strength hot-dip galvanized steel sheet having excellent deep drawability, according to the above-described item (6), characterized in that the cooling is started within 3 seconds after finish rolling of the above-described hot rolling is completed, the cooling to 720° C. is performed at an average cooling rate of 40° C./s or more, coiling is performed at a coiling temperature of higher than 600° C. and 700° C. or lower, and the reduction ratio of the above-described cold rolling is specified to be 50% or more.

According to the present invention, good deep drawability and enhancement of the strength to TS of 440 MPa or more can be achieved by regulating the Nb content and the C content in such a way that the above-described relational expression is satisfied, where the C content is within the range of 0.010% to 0.04%, and controlling the amount of solid solution; C* to be within the range satisfying the above-described relational expression, so as to ensure the average r value ≥1.30 through development of the {111} recrystallization texture, reduce the absolute value of the planar anisotropy of the r value (Δr) to 0.20 or less, and allow the steel sheet microstructure to include ferrite and martensite.

DETAILED DESCRIPTION OF EMBODIMENTS OF THE INVENTION

The present invention will be described below in detail with reference to exemplary embodiments.

To begin with, the chemical composition of the steel will be described. In this regard, % expressing the amount of the chemical composition refers to percent by mass unless otherwise specified.

C: 0.010% or more and 0.04% or less

Carbon is an element to form martensite and contribute to enhancement of the strength. If the amount of C is less than 0.010%, it is difficult to form martensite, so that a volume fraction of the martensitic phase of an aim cannot be ensured, and strength of 440 MPa or more is not obtained. On the other hand, if the amount of C is more than 0.04%, the area ratio of martensitic phase increases more than necessary, the area ratio of ferritic phase decreases, and a good r value (average r value 1.30) is not obtained, nor is good planar anisotropy of the r value (|Δr|≤0.20) obtained. Therefore, the amount of C is specified to be 0.010% or more and 0.04% or less, and in order to obtain better r value (average r value ≥1.35), the amount of C is specified to be preferably 0.010% or more and less than 0.035%. In this regard, in order to obtain TS≥500 MPa, the amount of C is specified to be preferably 0.015% or more, and in order to obtain TS≥590 MPa, the amount of C is specified to be preferably 0.020% or more.

Si: more than 1.0% and 1.5% or less

Silicon facilitates ferrite transformation, increases the amount of C in untransformed austenite, facilitates formation of a dual-phase of ferrite and martensite. In addition, Si has a solid solution hardening effect and, therefore, is an element effective in enhancing the strength. In order to obtain these effects, it is necessary that more than 1.0% of Si be contained. On the other hand, if more than 1.5% of Si is contained, surface appearance after coating is degraded because of an occurrence of red scale during hot rolling, and Si is concentrated on the surface during continuous annealing and reacts with very small amount of water vapor present in the atmosphere, Si based oxides are formed on the steel sheet surface, the wettability of the coating is made poor, so that the quality of coating is degraded. Therefore, the amount of Si is specified to be more than 1.0% and 1.5% or less, and preferably more than 1.0% and 1.4% or less.

Mn: 1.0% or more and 3.0% or less

Manganese is an element effective in formation of martensite and improves the hardenability to facilitate stable formation of martensite. If the amount of Mn is less than 1.0%, formation of martensite becomes difficult, a volume fraction of martensitic phase of aim cannot be ensured, and the strength of 440 MPa or more is not obtained. Therefore, from the viewpoint of ensuring of the strength, 1.0% or more of Mn is added, 1.2% or more is preferable, and 1.5% or more is more preferable. On the other hand, if more than 3.0% of Mn is added, not only slab cost is increased, but also the r value and the weldability are degraded. Therefore, the upper limit of the amount of Mn is specified to be 3.0%.

P: 0.005% or more and 0.1% or less

Phosphorus is a solid-solution hardening element and is an element effective in enhancing the strength. However, if the P content is less than 0.005%, the effect thereof is not obtained and, furthermore, an increase in dephosphorization cost is caused in a steel making process. Therefore, the amount of P is specified to be 0.005% or more, and preferably specified to be 0.01% or more. On the other hand, if the amount of P is more than 0.1%, P segregates at grain boundaries to degrade the resistance to cold-work embrittlement and the weldability. Meanwhile, in the alloying treatment after galvanization, diffusion of Fe from the steel sheet to the coating layer at the interface between the coating layer and the steel sheet is suppressed, and alloying treatability is degraded. Consequently, an alloying treatment at high temperatures is necessary, and coating peeling, e.g., powdering or chipping, of the resulting coating layer occurs easily. Therefore, the amount of P is specified to be 0.1% or less, preferably 0.06% or less, and more preferably less than 0.035%.

S: 0.01% or less

Sulfur degrades the hot workability, enhances the sensitivity of the slab to hot brittleness and, furthermore, is present as MnS in the steel to degrade the workability of the steel. Therefore, the amount of S is specified to be 0.01% or less.

Sol. Al: 0.005% or more and 0.5% or less

Aluminum is a solid-solution hardening element and is an element effective in enhancing the strength. In addition, Al serves as a deoxidizing element and has a function of decreasing inclusions in the steel. However, if the amount of sol. Al is less than 0.005%, the above-described function is not obtained stably. Therefore, the amount of sol. Al is specified to be 0.005% or more. On the other hand, if the amount of sol. Al is more than 0.5%, an increase in cost is caused and, furthermore, a surface defect is induced. Therefore, the upper limit of the amount of sol. Al is specified to be 0.5%, and preferably 0.1%.

N: 0.01% or less

The N content is preferably small. If the N content is more than 0.01%, the ductility, the toughness, and the surface quality are degraded because of generation of excessive nitrides. Therefore, the amount of N is specified to be 0.01% or less.

Nb: 0.010% or more and less than 0.05%

Niobium is one of important elements in the present invention. Niobium is an element which has a function of making the grain refinement of hot-rolled microstructures, which has a function of immobilizing C in the steel through precipitation as NbC in the hot rolled sheet, and which contributes to an increase in r value because of these functions. In order to obtain such effects, the Nb content is specified to be preferably 0.010% or more in the present invention. On the other hand, excessive Nb of 0.05% or more causes an increase in cost, increases a load in hot rolling, and enhances the deformation resistance during cold rolling, so that stable production with an actual facilities may become difficult. Meanwhile, as described later, solid solution C is necessary to form martensite during cooling after annealing in the present invention. If 0.05% or more of Nb is contained excessively, the amount of solid solution C is decreased, formation of martensite is hindered, so that a volume fraction of martensitic phase of aim cannot be ensured, and strength of 440 MPa or more is not obtained in some cases. Therefore, the Nb content is specified to be preferably 0.010% or more and less than 0.05%.

Ti: 0.015% or more and 0.120% or less

Titanium is one of important elements in the present invention. As with Nb, Ti is an element which has a function of immobilizing C through precipitation as carbides (TiC) in the hot rolled sheet and which contributes to an increase in r value because of these C immobilizing function. In order to obtain such effects, the Ti content is specified to be preferably 0.015% or more in the present invention. On the other hand, excessive Ti of more than 0.120% causes an increase in cost and, as with Nb, enhances the deformation resistance during cold rolling, so that stable production with an actual facilities may become difficult. In addition, if more than 0.120% of Ti is contained excessively, as with Nb, there is apprehension that formation of martensite during cooling after annealing is hindered. Therefore, the Ti content is specified to be preferably 0.015% or more and 0.120% or less.

$$(Nb/93)/(C/12)<0.20 \text{ and } 0.005<C^*\leq 0.020$$

In this regard, $C^*=C-(12/93)Nb-(12/48)\{Ti-(48/14)N-(48/32)S\}$ is defined, C, Nb, Ti, N, and S represent the contents (percent by mass) of C, Nb, Ti, N, and S, respectively, in the steel, and $C^*$ represents the amount of solid solution C. Here, in the case of $Ti-(48/14)N-(48/32)S\leq 0$, it is considered that $Ti-(48/14)N-(48/32)S=0$.

In the present invention, $(Nb/93)/(C/12)$ and $C^*$ are the most important indicators. Niobium is very expensive as compared with titanium and, in addition, there is apprehension that a rolling load in hot rolling is increased remarkably and the production stability is reduced. Meanwhile, in order to form martensite during cooling after annealing, as described above, the solid solution C ($C^*$) is required. Consequently, it is advantageous that $(Nb/93)/(C/12)$ and $C^*$ be appropriately controlled from the viewpoint of cost, production stability, and steel sheet properties.

If $(Nb/93)/(C/12)$ is 0.20 or more, the proportion of expensive Nb is high, so that the cost is high and, in addition, a load in hot rolling increases. Therefore, $(Nb/93)/(C/12)$ is specified to be less than 0.20. Meanwhile, if $C^*$ is 0.005 or less, a volume fraction of martensite of aim cannot be ensured, and it is difficult to obtain the strength of 440 MPa or more. Therefore, $C^*$ is specified to be more than 0.005. On the other hand, if $C^*$ is more than 0.020, formation of a {111} recrystallization texture of ferrite effective in increasing the r value is hindered and good deep drawability is not obtained in some cases. Furthermore, the vicinity of {100}<110> to {112}<110>, that is the main orientation, of the cold rolling texture which enhances the planar anisotropy of the r value ($\Delta r$) to the minus side (minus direction) remains after annealing, and $|\Delta r|\leq 0.20$ is not satisfied in some cases. Therefore, $C^*$ is specified to be more than 0.005 and 0.020 or less in order to achieve TS: 440 MPa or more, average r value: 1.30 or more, and $|\Delta r|\leq 0.20$. It is preferable that $C^*$ is specified to be 0.0185 or less to achieve average r value: 1.35 or more, and it is more preferable that $C^*$ is specified to be less than 0.0170 to achieve average r value: 1.40 or more.

The basic composition of embodiments of the steel sheet according to the present invention is as described above. In addition to the basic composition, at least one of Mo, Cr, and V and/or at least one of Cu and Ni can be selected and contained, as necessary.

At least one of Mo, Cr, and V in total: 0.5% or less

As with manganese, Mo, Cr, and V act on enhancement of the hardenability and stable generation of martensite effectively. Such effects become considerable when the content is 0.1% or more in total. On the other hand, when more than 0.5% of at least one of these elements in total is added, the effect is saturated and an increase in cost is caused. Therefore, the amount of addition of at least one of these elements in total is specified to be preferably 0.5% or less.

At least one of Cu: 0.3% or less and Ni: 0.3% or less

Copper is an element which is got mixed when scrap is utilized actively. In the present invention, by allowing admixture of Cu, the production cost can be cut through utilization of recycle resources. In this regard, an influence of Cu on the mechanical property for the steel sheet according to the present invention is small. However, the Cu content is specified to be preferably 0.3% or less because excessive admixture causes surface flaws.

Likewise, an influence of Ni on the mechanical property for the steel sheet is small, although in the case where Cu is added, Ni acts effectively on reduction of surface flaws of the steel sheet. This effect is obtained remarkably by including Ni one-half the content of Cu. Therefore, in the case where Ni is added, the lower limit of the amount of Ni is specified to be preferably one-half the amount of Cu. However, excessive addition of Ni promotes surface flaws resulting from unevenness of scale. Therefore, the amount of Ni is specified to be preferably 0.3% or less.

The high strength galvanized steel sheet according to the present invention can further select and contain at least one selected from Sn and Sb and/or Ta, as necessary, in addition to the above-described chemical composition.

At least one of Sn: 0.20% or less and Sb: 0.20% or less

Tin and antimony can be contained from the viewpoint of suppressing nitriding or oxidation of the steel sheet surface or decarbonization which occurs in a several tens of micrometers of region of the steel sheet surface because of oxidation. Suppression of such nitriding and oxidation prevents a decrease in the amount of generation of martensite on the steel sheet surface and improve the fatigue properties and the surface quality. From the viewpoint of suppression of nitriding and oxidation, in the case where Sn or Sb is contained, 0.01% or more is preferable, and 0.20% or less is preferable because more than 0.20% causes degradation in toughness.

Ta: 0.01% or more to 0.10% or less and $0.005 < C^* \leq 0.020$

As with Nb and Ti, Ta is an element which has a function of immobilizing C through precipitation as TaC in the hot rolled sheet and which contributes to an increase in r value because of these C immobilizing function. From such a point of view, 0.01% or more of Ta can be contained. On the other hand, excessive Ta content of more than 0.10% not only causes an increase in cost but also may hinder formation of martensite during cooling after annealing, as with Nb and Ti. Furthermore, TaC precipitated in the hot rolled sheet enhances the deformation resistance during cold rolling, so that stable production with an actual facilities may become difficult. Therefore, in the case where Ta is contained, 0.10% or less is preferable.

In the case where Ta is added, Ta is contained in such a way that $0.005 < C^* \leq 0.020$ is satisfied. In this regard, $C^* = C-(12/93)Nb-(12/181)Ta-(12/48)\{Ti-(48/14)N-(48/32)S\}$ is defined and C, Nb, Ta, Ti, N, and S represent the contents (percent by mass) of their respective elements in the steel. Here, in the case of Ti-(48/14)N-(48/32)S 0, it is considered that Ti-(48/14)N-(48/32)S=0.

If $C^*$ is 0.005 or less, a volume fraction of martensite of aim cannot be ensured, and it is difficult to obtain the tensile strength of 440 MPa or more. On the other hand, if $C^*$ is more than 0.020, formation of a {111} recrystallization texture of ferrite phase effective in increasing the r value is hindered and good deep drawability is not obtained in some cases. Furthermore, the vicinity of {100}<110> to {112}<110>, that is the main orientation, of the cold rolling texture which enhances the planar anisotropy of the r value ($\Delta r$) to the minus side (minus direction) remains after annealing, and $|\Delta r| \leq 0.20$ is not satisfied in some cases. Therefore, $C^*$ is specified to be more than 0.005 and 0.020 or less in order to achieve TS: 440 MPa or more, average r value: 1.30 or more, and $|\Delta r| \leq 0.20$. It is preferable that $C^*$ is specified to be 0.0185 or less to achieve average r value: 1.35 or more, and it is more preferable that $C^*$ is specified to be less than 0.0170 to achieve average r value: 1.40 or more.

In the steel sheet according to the present invention, chemical components other than those described above are Fe and incidental impurities. In this regard, examples of incidental impurities include oxygen (O). Oxygen (O) forms nonmetallic inclusions to adversely affect the quality. Therefore, it is preferable that the content thereof is decreased to 0.003% or less.

Next, the reasons for limiting the steel sheet microstructure according to the present invention will be described.

The steel sheet microstructure according to the present invention is a microstructure preferably including 80% or more of ferrite and 3% or more of martensite on an area ratio. In the present invention, the area ratio of each of ferrite and martensite is limited in order to ensure compatibility between the strength of the steel sheet and the press formability (in particular deep drawability).

Ferrite: 80% or more on an area ratio

Ferrite is a soft phase to ensure the press formability, in particular deep drawability, of the steel sheet. In the present invention, an increase in r value by developing the {111} recrystallization texture of ferrite is intended. If the area ratio of ferritic phase is less than 80%, it may be difficult to achieve average r value: 1.30 or more, and in some cases, good deep drawability cannot be ensured, so that the press formability may be degraded. Therefore, the area ratio of ferritic phase is specified to be 80% or more. In this regard, it is preferable that the area ratio of ferritic phase be 85% or more in order to further improve the average r value. On the other hand, if the area ratio of ferritic phase is more than 97%, the steel sheet strength is reduced and it may be difficult to ensure the strength of 440 MPa or more.

In this regard, "ferrite" includes polygonal ferrite and, in addition, bainitic ferrite which has been transformed from austenite and which has a high dislocation density.

Martensite: 3% or more on an area ratio

Martensite is a hard phase to ensure the strength of the steel sheet. If the area ratio of martensitic phase is less than 3%, the strength of the steel sheet is reduced and it is difficult to ensure the strength of 440 MPa or more. Therefore, the area ratio of martensitic phase is specified to be 3% or more. It is preferable that the area ratio of martensitic phase be 5% or more in order to further enhance the strength of the steel sheet. On the other hand, if the area ratio of martensitic phase is more than 20%, the area ratio of ferritic phase to improve the average r value decreases and it is difficult to ensure good deep drawability. Therefore, it is necessary that the area ratio of martensitic phase is specified to be 20% or less, and preferably 15% or less.

Meanwhile, the microstructure other than ferrite and martensite of the steel sheet according to the present invention may include pearlite, bainite, retained austenite, and incidental carbides insofar as the area ratio of them in total is 5% or less.

A method for manufacturing a galvanized steel sheet according to embodiments of the present invention will be described.

A galvanized steel sheet according to the present invention is preferably produced by sequentially performing a hot rolling step in which a molten steel having the above-described chemical composition is refined to prepare a steel material and the resulting steel material is subjected to hot rolling to prepare a hot rolled steel sheet, a cold rolling step in which the resulting hot rolled steel sheet is subjected to cold rolling to prepare a cold rolled steel sheet, and an annealing and galvanizing step in which the resulting cold rolled steel sheet is subjected to an annealing treatment and a galvanizing treatment.

In the present invention, the refining method of the steel is not specifically limited, and a known refining method, e.g., a convertor or an electric furnace, can be adopted. Also, after the refining, a steel slab is prepared by preferably a continuous casting method from the viewpoint of segregation and the like. However, the steel slab may also be prepared by a known casting method, e.g., an ingot making-roll of blooms method or a thin slab continuous casting method. Meanwhile, when the steel slab is hot rolled after casting, rolling may be performed after the slab is reheated in a furnace, or in the case where a temperature higher than or equal to a temperature of aim is held, the steel slab may be direct-rolled without being heated.

(Hot Rolling Step)

In the hot rolling step, the steel is heated and is subjected to rough rolling and finish rolling. In the present invention, the heating condition, the rough rolling condition, and the finish rolling condition of the steel are not necessarily limited. However, in the case where the steel is heated, it is preferable that the heating temperature be 1,100° C. or higher and 1,300° C. or lower and the finish temperature be the $Ar_3$ transformation temperature or higher and 1,000° C. or lower.

The coiling temperature is not limited, although 500° C. to 700° C. is preferable, and higher than 600° C. and 700° C. or lower is more preferable. If the coiling temperature is higher than 700° C., grain size is coarsened, a reduction in strength is feared and, in addition, an increase in r value after cold rolling and annealing may be hindered. Meanwhile, if the coiling temperature is lower than 500° C., precipitation of Nb and Ti becomes difficult, so that even when the values of C* are the same, the amount of C not immobilized by Nb and Ti increases, and this may be disadvantageous to an increase in r value. Therefore, the coiling temperature is preferably 500° C. or higher, and more preferably higher than 600° C.

Alternatively, in order to improve the r value by making the grain refinement of hot-rolled microstructures, it is more preferable that cooling be started within 3 seconds after the finish rolling is completed, cooling to 720° C. be performed at an average cooling rate of 40° C./s or more, and coiling be performed at a coiling temperature of higher than 600° C. and 700° C. or lower.

(Cold Rolling Step)

The cold rolling step may be performed following the conventional method, and it is preferable that, after the hot rolled sheet is pickled, cold rolling be performed at a cold rolling reduction of 50% to 90%. In general, an increase of the cold rolling reduction is effective in increasing the r value. If the cold rolling reduction is less than 50%, the {111} recrystallization texture of ferrite does not develop sufficiently, and excellent deep drawability is not obtained in some cases. Therefore, the cold rolling reduction is specified to be preferably 50% or more. On the other hand, if the cold rolling reduction is more than 90%, a load to roll during cold rolling increases, and there is apprehension that an incidence of troubles in stable continuous rolling processes increases along with this. Therefore, the cold rolling reduction is specified to be preferably 90% or less.

(Annealing and Galvanizing Step)

In the annealing step, the cold rolled steel sheet is heated in a temperature range of 700° C. to 800° C. at an average heating rate of less than 3° C./s, annealing is performed at an annealing temperature of 800° C. to 950° C., cooling is performed from the above-described annealing temperature at an average cooling rate of 3° C./s to 15° C./s, a galvanizing treatment is performed by dipping into a galvanizing bath, and cooling is performed at an average cooling rate of 5° C./s to 100° C./s after the galvanizing treatment. In the case where an alloying treatment of zinc coating is further performed after the galvanizing treatment, cooling is performed at an average cooling rate of 5° C./s to 100° C./s after the alloying treatment.

Average heating rate in temperature range of 700° C. to 800° C.: less than 3° C./s.

In embodiments of the present invention, TiC and NbC are precipitated at the stage of the hot rolled steel sheet, so that the recrystallization temperature of the cold rolled steel sheet obtained through the cold rolling step is a relatively high temperature. Therefore, when the cold rolled steel sheet is heated to the annealing temperature, heating in a temperature range of 700° C. to 800° C. is performed at an average heating rate of less than 3° C./s from the viewpoint of development of the {111} recrystallization texture effective in increasing the r value through facilitation of recrystallization. If this average heating rate is 3° C./s or more, formation of the {111} recrystallization texture of ferrite effective in increasing the r value is hindered and good deep drawability is not obtained in some cases. Furthermore, the vicinity of {100}<110> to {112}<110>, that is the main orientation, of the cold rolling texture which enhances the planar anisotropy of the r value (Δr) to the minus side (minus direction) remains after annealing, and |Δr|≤0.20 is not satisfied. Meanwhile, the above-described average heating rate is preferably 0.5° C./s or more from the viewpoint of the production efficiency.

Annealing temperature: 800° C. to 950° C.

In order to allow the steel sheet microstructure to become a dual-phase including ferrite and martensite, heating to a two-phase region of ferrite and austenite is performed in the annealing step. Therefore, the annealing temperature is specified to be 800° C. or higher in embodiments of the present invention. If the annealing temperature is lower than 800° C., a volume fraction of martensite of aim is not obtained after annealing and cooling and, in addition, recrystallization is not completed in the annealing step. Consequently, the {111} recrystallization texture of ferrite does not develop sufficiently, so that an increase in r value, i.e. average r value: 1.30 or more, and a decrease in Δr, i.e. |Δr|≤0.20, are not achieved. On the other hand, if the annealing temperature is higher than 950° C., unfavorably, the second phase (martensite, pearlite, bainite) increases more than necessary depending on the cooling condition thereafter, ferrite of the volume fraction of aim is not obtained, a good r value may not be obtained, and a reduction in productivity and an increase in energy cost are caused. Therefore, the annealing temperature is specified to be 800° C. to 950° C., and preferably 820° C. to 880° C.

The annealing time is specified to be preferably 15 seconds or more from the viewpoint of sufficient proceeding of concentration of alloy elements, e.g., carbon, on austenite and from the viewpoint of facilitation of development of the {111} recrystallization texture of ferrite. On the other hand, if the annealing time is more than 300 seconds, grain size is coarsened, and adverse effects, e.g., reduction in the strength and degradation in steel sheet surface quality, may be exerted on various properties of the steel sheet. In addition, the line speed of the continuous galvanizing line is decreased remarkably, so that a reduction in the productivity is caused. Therefore, the annealing time is specified to be preferably 15 to 300 seconds, and more preferably 15 to 200 seconds.

Average cooling rate from annealing temperature to galvanizing bath (primary cooling rate): 3° C./s to 15° C./s.

After soaking at the above-described annealing temperature, cooling to the temperature of the galvanizing bath usually held at 420° C. to 500° C. is performed at an average cooling rate: 3° C./s to 15° C./s. If the average cooling rate is less than 3° C./s, a pearlite formation nose is passed in a temperature range of 550° C. to 650° C. and, thereby, large amounts of pearlite and bainite are formed in the second phase, a volume fraction of martensite of aim is not obtained, and strength of aim is not obtained in some cases. On the other hand, in the case where the average cooling rate is more than 15° C./s, in cooling from the annealing temperature, concentration of elements, e.g., Mn and C, on γ due to γ→α transformation becomes insufficient, and in the case where the alloying treatment is performed, pearlite and the like are generated easily and a volume fraction of martensite of aim is not obtained, so that strength of aim is not obtained in some cases. Therefore, the average cooling rate from the annealing temperature to the galvanizing bath is specified to be 3° C./s to 15° C./s, and preferably, 5° C./s to 15° C./s.

After the cooling at the above-described primary cooling rate, the galvanizing treatment is performed by dipping into the galvanizing bath. The galvanizing treatment may be performed by a common method. In this regard, after the galvanizing treatment is performed by dipping into the galvanizing bath, an alloying treatment of zinc coating can also be performed, as necessary. In this case, as for the alloying treatment of zinc coating, for example, after the galvanizing treatment, heating to a temperature range of 500° C. to 700° C. and holding for several seconds to several tens of seconds are performed. In the steel according to embodiments of the present invention, even when such an alloying treatment is performed, large amount of pearlite and the like are not generated, a volume fraction of martensite of aim is obtained, and strength of aim can be ensured, because the cooling rate from the annealing temperature to the galvanizing bath is controlled as described above. As for the galvanizing condition, the amount of adhesion of coating is 20 to 70 g/m² per one surface and in the case where alloying is performed, the Fe percentage in the coating layer is specified to be preferably 6% to 15%.

Average cooling rate after galvanization treatment or after alloying treatment of zinc coating (secondary cooling rate): 5° C./s to 100° C./s.

As for the secondary cooling rate after the galvanization treatment is performed or after the alloying treatment of zinc coating is performed, cooling to a temperature range of 150° C. or lower is performed at an average cooling rate of 5° C./s to 100° C./s in order to obtain martensite stably. In the case of slow cooling, where the secondary cooling rate is less than 5° C./s, pearlite or bainite is generated in the vicinity of 400° C. to 500° C., a volume fraction of martensite of aim is not obtained, and strength of aim is not obtained in some cases. On the other hand, if the secondary cooling rate is more than 100° C./s, martensite becomes too hard, and the ductility is reduced. Consequently, the secondary cooling rate is specified to be 5° C./s to 100° C./s, and preferably 10° C./s to 100° C./s.

Furthermore, in the present invention, after the above-described cooling, temper rolling or leveler forming may be performed for the purpose of shape correction and surface roughness adjustment. In this regard, in the case where the temper rolling is performed, preferably, the elongation rate is specified to be about 0.3% to 1.5%.

Example 1

The present invention will be further described below with reference to the examples.

A steel having chemical composition shown in Table 1 was refined and cast through vacuum treatment, and was subjected to roughing, so that steel slabs having a sheet thickness of 30 mm were prepared. These slabs were heated to 1,200° C., hot rolling was performed at a finish rolling temperature (finish temperature) of 880° C., and cooling was performed under the condition shown in Figure 2. Thereafter, coiling was performed at 610° C., so as to produce hot rolled steel sheets having a sheet thickness of 4.5 mm. In this regard, in the hot rolling step, cooling was started within 3 seconds after finish rolling was completed. The resulting hot rolled steel sheet was pickled and subsequently, cold rolling was performed at a reduction ratio of 73%, so as to produce a cold rolled steel sheet having a sheet thickness of 1.2 mm.

Then, a sample cut from the cold rolled steel sheet obtained as described above was annealed in an infrared image furnace at an annealing temperature for a holding time shown in Table 2. Thereafter, primary cooling was performed, galvanization (coating bath temperature: 460° C.) was performed, an alloying treatment (520° C.×20 s) was performed, secondary cooling to a temperature of 150° C. or lower was performed, and temper rolling at an elongation rate of 0.5% was performed under the conditions shown in Table 2. Here, in the galvanizing treatment, the amount of adhesion was adjusted to become 50 g/m² per one surface (double-sided coating) and in the alloying treatment, the Fe percentage in the coating layer was adjusted to become 9% to 12%.

TABLE 1

| Steel No. | Chemical composition (percent by mass) | | | | | | | | | | | (Nb/93)/(C/12) | $C^* (= C - (12/93)Nb - (12/48)\{Ti - (48/14)N - (48/32)S\})$ | $C^* (= C - (12/93)Nb - (12/181)Ta - (12/48)\{Ti - (48/14)N - (48/32)S\})$ | Remarks |
|---|---|---|---|---|---|---|---|---|---|---|---|---|---|---|---|
| | C | Si | Mn | P | S | sol. Al | N | Nb | Ti | Ta | Others | | | | |
| A | 0.008 | 1.1 | 1.6 | 0.055 | 0.004 | 0.055 | 0.0031 | 0.012 | 0.025 | — | — | 0.19 | 0.0044 | — | Comparative steel |
| B | 0.014 | 0.8 | 0.9 | 0.062 | 0.005 | 0.074 | 0.0016 | 0.021 | 0.022 | — | — | 0.19 | 0.0090 | — | Comparative steel |
| C | 0.015 | 1.1 | 2.1 | 0.025 | 0.003 | 0.038 | 0.0030 | 0.013 | 0.015 | — | — | 0.11 | 0.0133 | — | Invention steel |
| D | 0.018 | 1.2 | 1.7 | 0.042 | 0.007 | 0.035 | 0.0023 | 0.012 | 0.016 | — | V: 0.10 Cr: 0.30 | 0.09 | 0.0165 | — | Invention steel |
| E | 0.022 | 1.5 | 2.2 | 0.022 | 0.009 | 0.033 | 0.0022 | 0.031 | 0.026 | — | — | 0.18 | 0.0168 | — | Invention steel |

TABLE 1-continued

| Steel No. | C | Si | Mn | P | S | sol. Al | N | Nb | Ti | Ta | Others | (Nb/93)/(C/12) | C*(=C−(12/93)Nb−(12/48){Ti−(48/14)N−(48/32)S}) | C*(=C−(12/93)Nb−(12/181)Ta−(12/48){Ti−(48/14)N−(48/32)S}) | Remarks |
|---|---|---|---|---|---|---|---|---|---|---|---|---|---|---|---|
| F | 0.026 | 1.3 | 1.9 | 0.039 | 0.002 | 0.066 | 0.0021 | 0.019 | 0.033 | — | Cu: 0.30 Ni: 0.15 | 0.09 | 0.0178 | — | Invention steel |
| G | 0.029 | 1.4 | 1.3 | 0.019 | 0.004 | 0.055 | 0.0023 | 0.042 | 0.031 | — | Mo: 0.20 Cr: 0.25 | 0.19 | 0.0193 | — | Invention steel |
| H | 0.028 | 1.1 | 2.2 | 0.015 | 0.005 | 0.043 | 0.0022 | 0.022 | 0.046 | — | — | 0.10 | 0.0174 | — | Invention steel |
| I | 0.032 | 1.2 | 1.9 | 0.025 | 0.005 | 0.041 | 0.0033 | 0.033 | 0.063 | — | — | 0.13 | 0.0167 | — | Invention steel |
| J | 0.033 | 1.1 | 2.1 | 0.033 | 0.008 | 0.044 | 0.0039 | 0.041 | 0.058 | — | — | 0.16 | 0.0196 | — | Invention steel |
| K | 0.034 | 1.2 | 2.0 | 0.018 | 0.003 | 0.039 | 0.0041 | 0.028 | 0.067 | — | — | 0.11 | 0.0183 | — | Invention steel |
| L | 0.039 | 1.3 | 2.1 | 0.022 | 0.002 | 0.044 | 0.0023 | 0.048 | 0.065 | — | — | 0.16 | 0.0193 | — | Invention steel |
| M | 0.036 | 1.1 | 1.8 | 0.019 | 0.005 | 0.033 | 0.0030 | 0.033 | 0.072 | — | — | 0.12 | 0.0182 | — | Invention steel |
| N | 0.038 | 1.3 | 2.2 | 0.016 | 0.008 | 0.110 | 0.0033 | 0.028 | 0.095 | — | — | 0.10 | 0.0165 | — | Invention steel |
| O | 0.030 | 1.2 | 1.9 | 0.031 | 0.005 | 0.045 | 0.0025 | 0.051 | 0.011 | — | — | 0.22 | 0.0234 | — | Comparative steel |
| P | 0.034 | 1.1 | 2.1 | 0.026 | 0.003 | 0.038 | 0.0031 | 0.012 | 0.128 | — | — | 0.05 | 0.0042 | — | Comparative steel |
| Q | 0.047 | 1.7 | 2.1 | 0.035 | 0.005 | 0.029 | 0.0033 | 0.045 | 0.035 | — | — | 0.12 | 0.0371 | — | Comparative steel |
| R | 0.015 | 1.2 | 1.3 | 0.042 | 0.004 | 0.042 | 0.0025 | 0.020 | 0.016 | 0.04 | Sn: 0.02 | 0.17 | — | 0.0094 | Invention steel |
| S | 0.023 | 1.1 | 2.0 | 0.052 | 0.005 | 0.038 | 0.0029 | 0.018 | 0.055 | — | — | 0.10 | 0.0113 | — | Invention steel |
| T | 0.024 | 1.3 | 2.0 | 0.055 | 0.005 | 0.033 | 0.0029 | 0.021 | 0.045 | 0.05 | Sn: 0.02 Sb: 0.03 | 0.11 | — | 0.0111 | Invention steel |
| U | 0.034 | 1.1 | 2.1 | 0.056 | 0.005 | 0.038 | 0.0023 | 0.025 | 0.082 | — | — | 0.09 | 0.0141 | — | Invention steel |
| V | 0.032 | 1.1 | 2.1 | 0.061 | 0.003 | 0.035 | 0.0021 | 0.022 | 0.071 | 0.03 | Sn: 0.03 | 0.09 | — | 0.0123 | Invention steel |

TABLE 2

| | | Hot rolling step | | Cold rolling step | Annealing and galvanizing step | | | | | | Temper rolling step |
|---|---|---|---|---|---|---|---|---|---|---|---|
| Steel sheet No. | Steel No. | Cooling rate after finish rolling (° C./s)*1 | Coiling temperature (° C.) | Rolling reduction (%) | Average heating rate in 700-800° C. (° C./s) | Annealing temperature (° C.) | Holding time at annealing temperature (s) | Primary cooling rate (° C./s)*2 | Alloying condition | Secondary cooling rate (° C./s)*3 | Elongation rate (%) |
| 1 | A | 30 | 610 | 73 | 1.5 | 850 | 90 | 10 | 520° C. × 20 s | 30 | 0.5 |
| 2 | B | 30 | 610 | 73 | 1.5 | 830 | 90 | 10 | 520° C. × 20 s | 30 | 0.5 |
| 3 | C | 30 | 610 | 73 | 1.5 | 840 | 90 | 10 | 520° C. × 20 s | 30 | 0.5 |
| 4 | D | 30 | 610 | 73 | 1.5 | 850 | 90 | 10 | 520° C. × 20 s | 30 | 0.5 |
| 5 | E | 30 | 610 | 73 | 1.5 | 840 | 90 | 10 | 520° C. × 20 s | 30 | 0.5 |
| 6 | F | 30 | 610 | 73 | 1.5 | 830 | 90 | 10 | 520° C. × 20 s | 30 | 0.5 |
| 7 | G | 30 | 610 | 73 | 1.5 | 840 | 90 | 10 | 520° C. × 20 s | 30 | 0.5 |
| 8 | H | 30 | 610 | 73 | 1.5 | 850 | 90 | 10 | 520° C. × 20 s | 30 | 0.5 |
| 9 | I | 30 | 610 | 73 | 1.5 | 830 | 90 | 10 | 520° C. × 20 s | 30 | 0.5 |
| 10 | J | 30 | 610 | 73 | 1.5 | 850 | 90 | 10 | 520° C. × 20 s | 30 | 0.5 |
| 11 | K | 30 | 610 | 73 | 1.5 | 840 | 90 | 10 | 520° C. × 20 s | 30 | 0.5 |
| 12 | L | 30 | 610 | 73 | 1.5 | 860 | 90 | 10 | 520° C. × 20 s | 30 | 0.5 |
| 13 | M | 30 | 610 | 73 | 1.5 | 850 | 90 | 10 | 520° C. × 20 s | 30 | 0.5 |
| 14 | N | 30 | 610 | 73 | 1.5 | 840 | 90 | 10 | 520° C. × 20 s | 30 | 0.5 |
| 15 | O | 30 | 610 | 73 | 1.5 | 860 | 90 | 10 | 520° C. × 20 s | 30 | 0.5 |
| 16 | P | 30 | 610 | 73 | 1.5 | 870 | 90 | 10 | 520° C. × 20 s | 30 | 0.5 |
| 17 | Q | 30 | 610 | 73 | 1.5 | 850 | 90 | 10 | 520° C. × 20 s | 30 | 0.5 |
| 18 | R | 30 | 610 | 73 | 1.5 | 850 | 90 | 10 | 520° C. × 20 s | 30 | 0.5 |
| 19 | S | 30 | 610 | 73 | 1.5 | 850 | 90 | 10 | 520° C. × 20 s | 30 | 0.5 |
| 20 | T | 30 | 610 | 73 | 1.5 | 850 | 90 | 10 | 520° C. × 20 s | 30 | 0.5 |
| 21 | U | 30 | 610 | 73 | 1.5 | 850 | 90 | 10 | 520° C. × 20 s | 30 | 0.5 |
| 22 | V | 30 | 610 | 73 | 1.5 | 850 | 90 | 10 | 520° C. × 20 s | 30 | 0.5 |

*1 Average cooling rate from start of cooling to 720° C. after finish rolling is completed
*2 Average cooling rate from annealing temperature to galvanizing bath
*3 Average cooling rate to temperature not more than 150° C. after alloying treatment of zinc coating Samples were taken from the thus obtained galvanized steel sheet, and microstructure observation and a tensile test were performed, so as to measure the area ratios of ferritic phase and martensitic phase, the tensile properties, the average r value, and the planar anisotropy of the r value (Δr). Test methods were as described below.

(i) Microstructure Observation

A test piece was taken from the resulting galvanized steel sheet, an L cross-section (vertical cross-section parallel to the rolling direction) at a position one-quarter sheet thickness was mechanically polished, and was etched with nital. Thereafter, a microstructure photograph (SEM photograph) taken with a scanning electron microscope (SEM) at a magnification of 2,000 times was used, the type of the microstructure was identified, and the area ratio was quantified. In the microstructure photograph, ferrite was a somewhat black contrast region, a region in which carbides were generated in the shape of a lamella was specified to be pearlite, a region in which carbides were generated in the shape of sequence of points was specified to be bainite, and grains with white contrast was specified to be martensite or retained austenite. Types of the microstructure were identified as described above and, thereby, the area ratio of ferritic phase in the visual field of observation was able to be quantified. In this regard, as for determination whether the above-described grains with white contrast were martensite or retained austenite, the galvanized steel sheet was subjected to a tempering treatment at 250° C. for 4 hours. Thereafter, a microstructure photograph was taken in the same manner as in the above description. In the microstructure photograph, a region in which carbides were generated in the shape of a lamella was specified to be the region which had been pearlite before the above-described tempering treatment, and a region in which carbides were generated in the shape of sequence of points was specified to be the region which had been bainite or martensite before the above-described tempering. Meanwhile, grains remaining while having white contrast were counted as retained austenite and the area ratio thereof was determined. A difference between the thus determined area ratio of grains with white contrast after the tempering treatment (retained austenite) and the area ratio of grains with white contrast before the tempering treatment (martensite or retained austenite) was calculated and, thereby, each area ratio was able to be determined, so that the area ratio of the martensitic phase was determined. In this regard, as for the area ratio of each phase, transparent OHP sheets were colored based on stratification on a phase basis, image was taken, binarization was performed, and the area ratio was determined with image analysis software (Microsoft Digital Image Pro Plus).

(ii) Tensile Test

A JIS No. 5 test piece (JIS Z 2201) in which a tensile direction was 90° direction (C direction) to the rolling direction was taken from the resulting galvanized steel sheet. A tensile test was performed in conformity with the specification of JIS Z 2241, and the tensile strength (TS) and the total elongation (EL) were measured.

(iii) Average r Value (Average Plastic Strain Ratio)

A JIS No. 5 test piece in which a tensile direction was 0° direction (L direction), 45° direction (D direction), or 90° direction (C direction) to the rolling direction was taken from the resulting galvanized steel sheet. A tensile strain of 10% was applied to each of these test pieces, and the true strain in the width direction and the true strain in the thickness direction of each test piece were measured. An average r value (average plastic strain ratio) was determined from these measurement values on the basis of the following formula in conformity with the specification of JIS Z 2254, and this was taken as the average r value. average r value=$(r_0+2r_{45}+r_{90})/4$ In this regard, $r_0$, $r_{45}$, and $r_{90}$ represent plastic strain ratios of test pieces taken in the 0°, 45°, and 90° directions, respectively, to the rolling direction. In addition, the planar anisotropy of the r value (Δr) was determined on the basis of the following formula.

$$\Delta r = (r_0 - 2r_{45} + r_{90})/2$$

The obtained results are shown in Table 3.

TABLE 3

| Steel sheet No. | Steel No. | Area fravction of ferritic phase (%) | Area fraction of martensitic phase (%) | Others* | TS (MPa) | EL (%) | Average r value | Δr | Remarks |
|---|---|---|---|---|---|---|---|---|---|
| 1 | A | 94 | 1 | P | 419 | 42.2 | 1.70 | −0.05 | Comparative example |
| 2 | B | 90 | 2 | P | 434 | 40.5 | 1.55 | −0.08 | Comparative example |
| 3 | C | 94 | 4 | P | 471 | 37.3 | 1.54 | −0.12 | Invention example |
| 4 | D | 92 | 6 | P | 532 | 33.0 | 1.43 | −0.16 | Invention example |
| 5 | E | 91 | 8 | P, B | 579 | 29.8 | 1.42 | −0.17 | Invention example |
| 6 | F | 87 | 9 | P, B | 598 | 29.2 | 1.38 | −0.17 | Invention example |
| 7 | G | 88 | 11 | P, B | 644 | 27.1 | 1.33 | −0.19 | Invention example |
| 8 | H | 89 | 10 | P, B | 628 | 27.8 | 1.39 | −0.17 | Invention example |
| 9 | I | 88 | 9 | P, B | 600 | 29.2 | 1.42 | −0.16 | Invention example |
| 10 | J | 87 | 11 | P, B | 645 | 27.5 | 1.32 | −0.19 | Invention example |
| 11 | K | 88 | 10 | P, B | 631 | 27.2 | 1.37 | −0.18 | Invention example |
| 12 | L | 87 | 11 | B, γ | 653 | 26.5 | 1.34 | −0.19 | Invention example |
| 13 | M | 86 | 10 | B, γ | 625 | 28.0 | 1.37 | −0.17 | Invention example |
| 14 | N | 90 | 9 | B, γ | 605 | 29.2 | 1.43 | −0.15 | Invention example |
| 15 | O | 75 | 21 | P, B | 702 | 24.9 | 1.19 | −0.24 | Comparative example |
| 16 | P | 95 | 2 | P, B | 428 | 39.8 | 1.69 | −0.06 | Comparative example |
| 17 | Q | 71 | 26 | B, γ | 750 | 23.5 | 0.88 | −0.33 | Comparative example |
| 18 | R | 92 | 4 | P, B | 485 | 36.0 | 1.56 | −0.09 | Invention example |
| 19 | S | 89 | 7 | P, B | 556 | 31.6 | 1.51 | −0.11 | Invention example |
| 20 | T | 92 | 5 | P, B | 508 | 34.2 | 1.51 | −0.11 | Invention example |
| 21 | U | 89 | 8 | P, B | 579 | 30.5 | 1.46 | −0.14 | Invention example |
| 22 | V | 90 | 6 | P, B | 532 | 32.8 | 1.48 | −0.12 | Invention example |

*P: pearlite, B: bainite, γ: retained austenite (retained γ)

The invention examples (Steel sheet Nos. 3 to 14 and 18 to 22) are steel sheets having strength and deep drawability in combination, where TS is 440 MP or more, the average r value is 1.30 or more, and the absolute value of the planar anisotropy of the r value (Δr) is 0.20 or less. Also, the invention examples (Steel sheet Nos. 3 to 6, 8, 9, 11, 13, 14, and 18 to 22) in which C* is 0.185 or less showed average r values of 1.35 or more and, furthermore, the invention examples (Steel sheet Nos. 3 to 5, 9, 14, and 18 to 22) in which C* is less than 0.170 showed average r values of 1.40 or more, so that very good deep drawability was exhibited.

On the other hand, as for comparative examples, the amount of C and C* of Steel sheet No. 1 and the amount of Si and the amount of Mn of Steel sheet No. 2 do not satisfy the range according to the present invention and, therefore, a volume fraction of martensite of aim is not obtained and TS is less than 440 MPa. Also, the amount of Ti of Steel sheet No. 16 is more than the range according to the present invention and, as a result, C* does not satisfy the range according to the present invention, a volume fraction of martensitc of aim is not obtained, and TS is less than 440 MPa. Furthermore, the amount of Ti of Steel sheet No. 15 and the amount of C of Steel sheet No. 17 do not satisfy the range according to the present invention and, as a result, C* is more than the range according to the present invention, so that the area ratio of ferritic phase effective in increasing the r value is low, the average r value is less than 1.30, and the planar anisotropy of the r value (Δr) does not satisfy the range according to the present invention. Moreover, as for Steel sheet No. 15, the Nb content and (Nb/93)/(C/12) are more than the range according to the present invention and, therefore, there is apprehension for reduction in productivity along with an increase in hot rolling load. As for Steel sheet No. 17, the Si content is more than the range according to the present invention and, therefore, there is apprehension for degradation in surface appearance resulting from an occurrence of red scale during hot rolling.

Example 2

Steels having chemical compositions shown in Steel Nos. E, H, and M in Table 1 were refined and cast through vacuum treatment, and was subjected to roughing, so that steel slabs having a sheet thickness of 30 mm were prepared. These slabs were heated to 1,200° C. and, thereafter, hot rolling was performed at a finish rolling temperature (finish temperature) of 880° C., so as to produce hot rolled steel sheets having a sheet thickness of 4.5 mm. In this regard, in the hot rolling step, cooling was started within 3 seconds after finish rolling was completed. Meanwhile, conditions of the average cooling rate from the start of cooling after finish rolling to 720° C. and the coiling temperature were as shown in Table 4. The thus obtained hot rolled steel sheet was pickled and subsequently, cold rolling was performed at a reduction ratio of 73%, so as to produce a cold rolled steel sheet having a sheet thickness of 1.2 mm. Then, a sample cut from the cold rolled steel sheet obtained as described above was annealed in an infrared image furnace at an annealing temperature for a holding time shown in Table 4. Thereafter, primary cooling was performed, galvanization (coating bath temperature: 460° C.) was performed, an alloying treatment (520° C.×20 s) was performed, secondary cooling to a temperature of 150° C. or lower was performed, and temper rolling at an elongation rate of 0.5% was performed. In the case where an alloying treatment was not performed, galvanization was performed and, thereafter, secondary cooling to a temperature of lower than 150° C. was performed, and temper rolling at an elongation rate of 0.5% was performed. Here, in the galvanizing treatment, the amount of adhesion was adjusted to become 50 g/m² per one surface (double-sided coating) and in the alloying treatment, the Fe percentage in the coating layer was adjusted to become 9% to 12%.

In the same manner as in Example 1, samples were taken from the thus obtained galvanized steel sheet and microstructure observation and a tensile test were performed, so as to measure the area ratios of ferritic phase and martensitic phase, the tensile properties, the average r value, and the planar anisotropy of the r value (Δr).

The obtained results are shown in Table 5.

TABLE 4

| Steel sheet No. | Steel No. | Hot rolling step | | Cold rolling step Rolling reduction (%) | Annealing and galvanizing step | | | | | | Temper rolling step Elongation rate (%) |
|---|---|---|---|---|---|---|---|---|---|---|---|
| | | Cooling rate after finish rolling (° C./s)*1 | Coiling temperature (° C.) | | Average heating rate in 700-800° C. (° C./s) | Annealing temperature (° C.) | Holding time at annealing temperature (s) | Primary cooling rate (° C./s)*2 | Alloying condition | Secondary cooling rate (° C./s)*3 | |
| 23 | E | 30 | 610 | 73 | 1.5 | 840 | 90 | 10 | 520° C. × 20 s | 30 | 0.5 |
| 24 | | 50 | 650 | 73 | 0.5 | 850 | 100 | 10 | 520° C. × 20 s | 30 | 0.5 |
| 25 | | 70 | 630 | 73 | 1.0 | 860 | 100 | 15 | 520° C. × 20 s | 30 | 0.5 |
| 26 | | 30 | 720 | 73 | 2.0 | 840 | 90 | 10 | 520° C. × 20 s | 30 | 0.5 |
| 27 | | 30 | 480 | 73 | 2.0 | 840 | 90 | 10 | 520° C. × 20 s | 30 | 0.5 |
| 28 | | 20 | 580 | 73 | 2.0 | 780 | 60 | 5 | 520° C. × 20 s | 60 | 0.5 |
| 29 | | 30 | 610 | 73 | 1.5 | 960 | 60 | 5 | 520° C. × 20 s | 40 | 0.5 |
| 30 | | 70 | 630 | 73 | 1.5 | 850 | 350 | 5 | 520° C. × 20 s | 60 | 0.5 |
| 31 | | 30 | 550 | 73 | 2.0 | 860 | 60 | 1 | 520° C. × 20 s | 40 | 0.5 |
| 32 | | 30 | 530 | 73 | 2.0 | 850 | 60 | 20 | 520° C. × 20 s | 40 | 0.5 |
| 33 | | 20 | 610 | 73 | 1.5 | 850 | 90 | 10 | 520° C. × 20 s | 3 | 0.5 |
| 34 | H | 30 | 610 | 73 | 1.5 | 850 | 90 | 10 | 520° C. × 20 s | 30 | 0.5 |
| 35 | | 70 | 610 | 73 | 1.0 | 860 | 120 | 15 | 520° C. × 20 s | 30 | 0.5 |
| 36 | | 20 | 610 | 73 | 2.0 | 860 | 60 | 15 | none | 60 | 0.5 |
| 37 | M | 30 | 610 | 73 | 1.5 | 850 | 90 | 10 | 520° C. × 20 s | 30 | 0.5 |
| 38 | | 70 | 650 | 73 | 1.0 | 860 | 120 | 10 | 520° C. × 20 s | 30 | 0.5 |
| 39 | | 30 | 610 | 73 | 2.0 | 860 | 60 | 10 | none | 60 | 0.5 |
| 40 | | 20 | 610 | 73 | 5.0 | 850 | 60 | 10 | 520° C. × 20 s | 30 | 0.5 |

*1Average cooling rate from start of cooling to 720° C. after finish rolling is completed
*2Average cooling rate from annealing temperature to galvanizing bath
*3Average cooling rate to temperature not more than 150° C. after alloying treatment of zinc coating or after galvanization (in the case where alloying treatment is not performed)

TABLE 5

| Steel sheet No. | Steel No. | Steel microstructure | | | Mechanical properties | | | | Remarks |
|---|---|---|---|---|---|---|---|---|---|
| | | Area fraction of ferritic phase (%) | Area fraction of martensitic phase (%) | Others* | TS (MPa) | EL (%) | Average r value | Δr | |
| 23 | E | 91 | 8 | P, B | 579 | 29.8 | 1.42 | −0.17 | Invention example |
| 24 | | 92 | 7 | P, B | 560 | 31.6 | 1.50 | −0.13 | Invention example |
| 25 | | 91 | 8 | P, B | 576 | 30.4 | 1.47 | −0.10 | Invention example |
| 26 | | 90 | 6 | P, B | 535 | 32.6 | 1.35 | −0.17 | Invention example |
| 27 | | 88 | 10 | P, B | 619 | 28.7 | 1.34 | −0.19 | Invention example |
| 28 | | 97 | <u>1</u> | P, B | <u>428</u> | 29.9 | <u>1.11</u> | <u>−0.52</u> | Comparative example |
| 29 | | <u>40</u> | 25 | P, B | 781 | 22.0 | <u>1.02</u> | <u>−0.44</u> | Comparative example |
| 30 | | 91 | 7 | P, B | 563 | 31.4 | 1.48 | −0.14 | Invention example |
| 31 | | 84 | <u>1</u> | P, B | <u>428</u> | 41.8 | 1.55 | −0.12 | Comparative example |
| 32 | | 85 | <u>2</u> | P, B | <u>438</u> | 40.5 | 1.61 | −0.13 | Comparative example |
| 33 | | 84 | <u>2</u> | P, B | <u>433</u> | 39.9 | 1.59 | −0.18 | Comparative example |
| 34 | H | 89 | 10 | P, B | 628 | 27.8 | 1.39 | −0.18 | Invention example |
| 35 | | 88 | 11 | P, B | 640 | 27.3 | 1.44 | −0.11 | Invention example |
| 36 | | 89 | 11 | — | 661 | 26.9 | 1.41 | −0.19 | Invention example |
| 37 | M | 86 | 10 | B, γ | 625 | 28.0 | 1.37 | −0.13 | Invention example |
| 38 | | 87 | 10 | B, γ | 637 | 27.5 | 1.43 | −0.11 | Invention example |
| 39 | | 88 | 12 | — | 663 | 26.2 | 1.35 | −0.15 | Invention example |
| 40 | | 85 | 12 | B, γ | 675 | 26.3 | <u>1.18</u> | <u>−0.22</u> | Comparative example |

*P: pearlite, B: bainite, γ: retained austenite (retained γ)

The invention examples (Steel sheet Nos. 23 to 27, 30, and 34 to 39) satisfying the manufacturing condition according to the present invention are steel sheets having strength and deep drawability in combination, where TS is 440 MP or more, the average r value is 1.30 or more, and the absolute value of the planar anisotropy of the r value (Δr) is 0.20 or less. Furthermore, the invention examples (Steel sheet Nos. 24, 25, 30, 35, and 38), in which the average cooling rate after the finish rolling was completed was specified to be 40° C./s or more for the purpose of increasing the r value by making the grain refinement of hot-rolled microstructures, have high average r values and small planar anisotropy of the r value (Δr) as compared with other steel sheets of the invention examples in which the average cooling rate after the finish rolling was completed was specified to be less than 40° C./s.

On the other hand, as for comparative examples not satisfying the manufacturing condition according to the present invention, the annealing temperature of Steel sheet No. 28 is lower than the range according to the present invention and, therefore, a volume fraction of martensite is not obtained and TS is less than 440 MPa. As for Steel sheet No. 29, the annealing temperature is higher than the range according to the present invention and austenite single phase region annealing is performed. Therefore, ferrite effective in increasing the r value is not generated during the cooling step thereafter, so that the average r value is less than 1.30. The primary cooling temperature of Steel sheet No. 31 is out of the range according to the present invention and is less than 3° C./sec. Therefore, a pearlite nose is passed in a temperature range of 550° C. to 650° C. and, thereby, a large amount of pearlite is formed in the second phase, a volume fraction of martensite of aim is not obtained, and TS is less than 440 MPa. The primary cooling rate of Steel sheet No. 32 is out of the range according to the present invention and is more than 15° C./s. Therefore, concentration of elements, e.g., Mn and C, on austenite due to γ→α transformation becomes insufficient, pearlite and bainite are generated in the alloying treatment, a predetermined amount of martensite is not obtained, so that TS is less than 440 MPa. The secondary cooling rate of Steel sheet No. 33 is out of the range according to the present invention and is less than 5° C./s. Therefore, pearlite and bainite are generated in the vicinity of 400° C. to 500° C., a volume fraction of martensite of aim is not obtained, and TS is less than 440 MPa. As for Steel sheet No. 40, the average heating rate in 700° C. to 800° C. in the annealing step is more than the range according to the present invention. Therefore, the development of the {111} recrystallization texture of ferrite becomes insufficient, the average r value is less than 1.30, and Δr is large.

According to the present invention, a high strength galvanized steel sheet having excellent deep drawability, where an average r value is 1.30 or more and an absolute value of the planar anisotropy of the r value is 0.20 or less even when TS is 440 MPa or more and, furthermore, the strength is higher, that is, TS is 500 MPa or more or TS is 590 MPa or more, can be inexpensively stably produced by minimizing expensive Nb and utilizing Ti actively. Therefore, a particularly good effect is obtained industrially. For example, in the case where the high strength galvanized steel sheet according to the present invention is applied to automobile parts, the strength of the parts which have been difficult to press form can be enhanced, and there is an effect on the capability of contributing to crash safety and weight reduction of an automobile body sufficiently. In addition, it is possible to apply to not only automobile parts but also household electrical appliance parts and pipe materials.

The invention claimed is:

1. A high strength hot-dip galvanized steel sheet having excellent deep drawability comprising a chemical composition containing C: 0.010% or more and 0.04% or less, Si: more than 1.0% and 1.5% or less, Mn: 1.0% or more and 3.0% or less, P: 0.005% or more and 0.1% or less, S: 0.01% or less, sol. Al: 0.005% or more and 0.5% or less, N: 0.01% or less, Nb: 0.010% or more and less than 0.05%, Ti: 0.015% or more and 0.120% or less, and the remainder comprising Fe and incidental impurities, on a percent by mass basis, wherein contents (percent by mass) of Nb and C in the steel satisfy the relationship of (Nb/93)/(C/12)<0.20 and further satisfy 0.005<C*≤0.020 and wherein a steel sheet microstructure includes 80% or more of ferrite and 3% or more of martensite on an area ratio basis, the tensile strength is 440 MPa or more, the average r value is 1.30 or more, and the absolute value of the planar anisotropy of the r value (Δr) is 0.20 or less, where C*=C-(12/93)Nb-(12/48){Ti-(48/14)N-(48/32)S} and C, Nb, Ti, N, and S represent the contents (percent by mass) of their respective elements in the steel.

2. The high strength hot-dip galvanized steel sheet having excellent deep drawability, according to claim 1, further comprising at least one of Cu: 0.3% or less and more than 0.0%, and Ni: 0.3% or less and more than 0.0% on a percent by mass basis in addition to the chemical composition.

3. The high strength hot-dip galvanized steel sheet having excellent deep drawability, according to claim 1, further comprising 0.5% or less and more than 0.0% of at least one of Mo, Cr, and V in total on a percent by mass basis in addition to the chemical composition.

4. The high strength hot-dip galvanized steel sheet having excellent deep drawability, according to claim 3, further comprising at least one of Cu: 0.3% or less and more than 0.0%, and Ni: 0.3% or less and more than 0.0% on a percent by mass basis in addition to the chemical composition.

\* \* \* \* \*